United States Patent [19]
Someya et al.

[11] Patent Number: 5,473,210
[45] Date of Patent: Dec. 5, 1995

[54] STATOR FOR MINIATURE MOTORS

[75] Inventors: Ryouichi Someya; Satoshi Suzuki; Hiroaki Takashima; Katsuyuki Ichikawa; Katsuhiko Katayama; Kunio Hiromasa; Kenichi Ebashi, all of Matsudo, Japan

[73] Assignee: Mabuchi Motor Co., Ltd., Chiba, Japan

[21] Appl. No.: 287,167

[22] Filed: Aug. 8, 1994

Related U.S. Application Data

[63] Continuation of Ser. No. 980,746, Nov. 24, 1992.

[30] Foreign Application Priority Data

Nov. 28, 1991 [JP] Japan ................................ 3-314315

[51] Int. Cl.⁶ .................................................. H02K 21/26
[52] U.S. Cl. ............................. 310/154; 310/254; 29/607
[58] Field of Search ............................. 310/154, 44, 46, 310/179, 216, 258, 259, 254; 29/607, 596

[56] References Cited

U.S. PATENT DOCUMENTS

| 4,636,107 | 1/1987 | Casler et al. ............... 310/154 X |
| 4,745,319 | 5/1988 | Tomite et al. ............... 310/154 |
| 4,795,932 | 1/1989 | Long ........................... 310/154 |
| 4,933,582 | 6/1990 | Hata et al. .................. 310/154 |

FOREIGN PATENT DOCUMENTS 1256932  12/1971  United Kingdom.

Primary Examiner—Peter S. Wong
Assistant Examiner—E. To
Attorney, Agent, or Firm—McGlew and Tuttle

[57] ABSTRACT

A stator for miniature motors having a permanent magnet fixedly fitted to the inner circumferential surface of a housing formed into a bottomed hollow cylindrical shape, in which the circumferential surface of the housing consists of two opposing flat parts and two concave cylindrical surfaces; engaging projections are provided on the flat parts, and flat surfaces coming in contact with said flat parts, and engaging surfaces facing coming in contact with the engaging projections are provided on the axial edge of the permanent magnet made of a flexible ferromagnetic material, and formed into an arc-segment shape in cross section; and the permanent magnet is fixedly fitted in the housing by bringing the arc-segment-shaped outer circumferential surfaces of the permanent magnet in contact with the cylindrical surfaces of the housing, and bringing the flat surfaces on the axial edges of the permanent magnet in contact with the flat parts by causing the engaging projections to cut into the engaging surfaces by the plastic deformation of the engaging projections in a state where the permanent magnet is inserted into the housing.

11 Claims, 2 Drawing Sheets

FIG. I
(PRIOR ART)
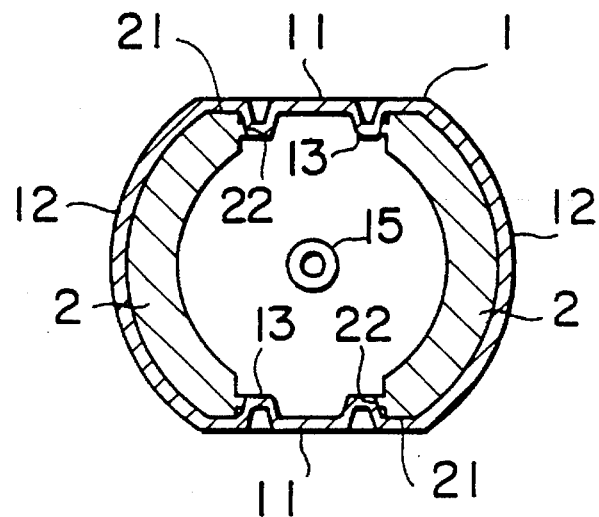
FIG. 2
(PRIOR ART)
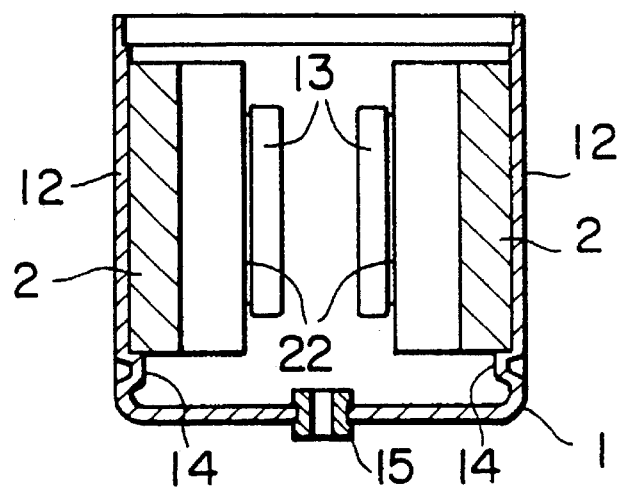

STATOR FOR MINIATURE MOTORS

This is a continuation application of application Ser. No. 980,746, filed Nov. 24, 1992.

BACKGROUND OF THE INVENTION

This invention relates generally to a stator for miniature motors having a permanent magnet fixedly fitted to the inner circumferential surface of a housing formed into a bottomed hollow cylindrical shape, and more particularly to a stator for miniature motors in which the permanent magnet is made of a flexible ferromagnetic material, and improvement is made so that the permanent magnet can be easily and positively fitted into the housing.

DESCRIPTION OF THE PRIOR ART

It is publicly known that miniature motors used for cameras, VTR movie cameras, etc. have such a construction that a stator is formed by fixedly fitting a permanent magnet to the inner circumferential surface of a housing formed into a bottomed cylindrical shape. An end plate is fitted to the opening of the housing, and a rotor having an armature coil is incorporated in the stator. Such miniature motors are widely used to drive various types of equipment.

The permanent magnet most commonly used in these miniature motors is a ferrite sintered magnet. This type of sintered magnet is often formed into an arc-segment shape, requiring much time and labor for manufacture. Also the sintering process tends to cause unwanted distortion or deformation, leading to uneven shape and dimensions, deteriorating accuracy. When such a permanent magnet of poor accuracy is fitted to a housing constituting a stator, the permanent magnet cannot necessarily come in close contact with the housing and produces a gap between the magnet and the housing. This results in an uneven field strength or magnetic flux density working on the armature coil, and makes rotor revolution uneven, thus remarkably deteriorating the performance of the miniature motor.

To solve these problems, a proposal disclosed in Japanese Published and Examined Utility Model Application No. 50002/1978 has been disclosed. FIGS. 1 and 2 are a cross-sectional view and longitudinal sectional plan view illustrating a stator according to the aforementioned improvement proposal. In FIGS. 1 and 2, numeral 1 refers to a housing made of a metallic material, such as mild steel, and formed into a bottomed hollow cylindrical shape. The housing 1 consists of two opposing flat parts 11 and 11, and two opposing cylindrical parts 12 and 12. Engaging ridges 13 are formed on the flat parts 11 and 11 by embossing the flat parts 11 from the outer circumferential surface thereof toward the inner space at locations near the cylindrical parts 12 and 12, while positioning projections 14 and 14 are formed on the cylindrical parts 12 and 12 by embossing the housing 1 from the outer circumferential surface thereof toward the inner space at locations near the bottom thereof. Numeral 15 refers to a bearing.

Numeral 2 refers to a permanent magnet made of a material consisting chiefly of ferrite powder and a synthetic resin, and formed into an arc-segment shape in cross section in such a manner that the circumferential length of the outer circumferential surface of the magnet 2 is made equal to the circumferential length of the inner circumferential surface of the cylindrical parts 12. Flat surfaces 21 coming in contact with the inside surface of the flat parts 11, and ridges 22 coming in contact with the engaging ridges 13 are provided on the axial edges of the permanent magnet 2. The axial length of the engaging ridges 13 and the ridges 22 is made slightly smaller than the axial length of the permanent magnet 2.

When the permanent magnet 2 is press-fitted from the open end of the housing 1 in the axial direction to assemble the stator having the aforementioned construction, the permanent magnet 2 is advanced into the housing 1 while the ridges 22 are slightly compressed by the flexibility of the permanent magnet 2. Thus, the permanent magnet 2 is fixedly fitted to the housing 1 because the magnet 2 comes in close contact with the inside surfaces of the flat parts 11 and the cylindrical parts 12.

A stator having the aforementioned construction has high dimensional accuracy, is free from breaking and cracking due to press-fitting, and eliminates the need for adhesive and engaging members for assembly. The press-fitting allowance of the permanent magnet 2 can be adjusted, allowing for the amount of collapse of the ridges 22.

In the stator for miniature motors having the aforementioned construction, however, part of the ridges 22 may be scraped off by the engaging ridges 13 as the permanent magnet 2 is press-fitted into the housing 1. Furthermore, if the amount of collapse of the ridges happens to increase due to dimensional errors, part of the collapsed ridges 22 may bend over the engaging ridges 13, scraping off part of the engaging ridges 13 in extreme cases.

After the permanent magnet 2 has been press-fitted into the housing 1, the inside of the housing 1 is usually cleaned by compressed-air blasting, etc. to remove the scraped chips as described above. However, chips and other foreign matter that have been left unremoved even after the cleaning are likely to scatter inside the miniature motor after assembly, deteriorating the functions of the miniature motor. In addition, the ridges 22 bending over the engaging ridges 13, as noted above, may interfere with the outer periphery of the rotor. This hinders the functions of the motor since the gap between the inner circumferential surface of the permanent magnet 2 and the outer circumferential surface of the rotor (not shown) is usually made extremely small to ensure the effective operation of magnetic fluxes of the permanent magnet 2.

SUMMARY OF THE INVENTION

This invention is intended to solve these problems inherent in the prior art. It is an object of this invention to provide a stator for miniature motors which has high reliability and can positively fix the permanent magnet in the housing without fear of chips and foreign matter scattering inside the motor after the permanent magnet has been fixedly fitted to the housing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIGS. 1 and 2 are a cross-sectional view and a longitudinal sectional plan view illustrating the essential part of a conventional type of stator.

DETAILED DESCRIPTION OF THE EMBODIMENTS

Figure 3:
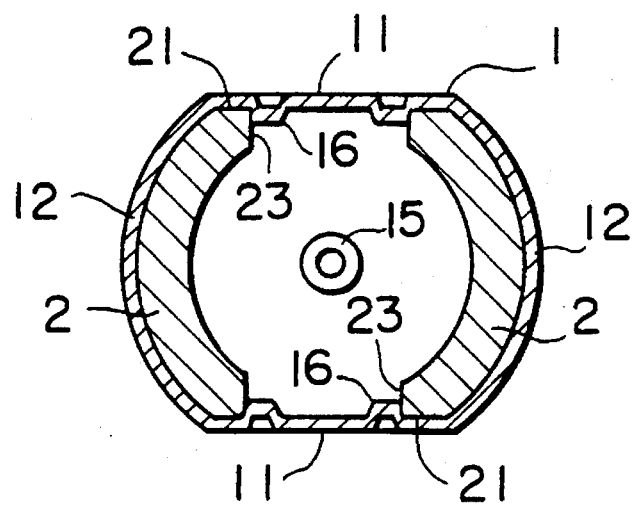
FIG. 3 is a cross-sectional view illustrating the essential part of an embodiment of this invention.
Figure 4:
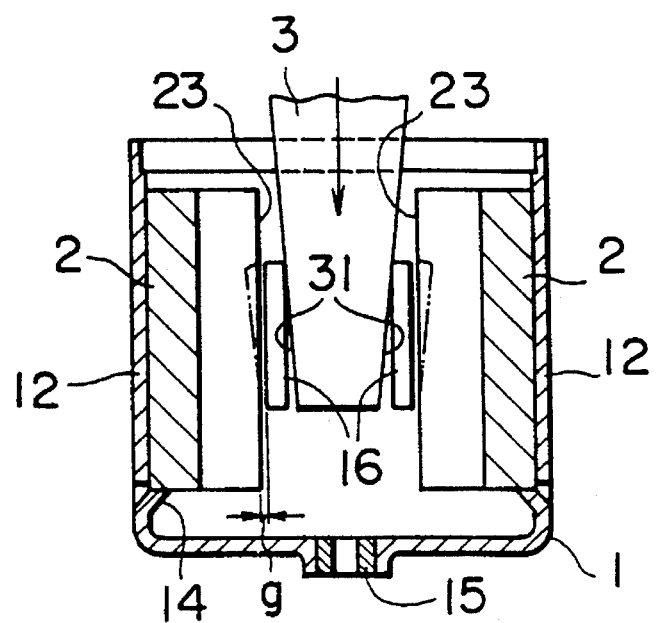
FIG. 4 is a longitudinal sectional plan view illustrating an example of a means for fixedly fitting a permanent magnet in an embodiment of this invention.

In FIGS. 3 and 4 like parts are indicated by like numerals used in FIGS. 1 and 2. In FIGS. 3 and 4, numeral 16 refers to engaging projections provided on the flat parts 11 and 11 of the housing 1 by embossing the flat parts 11 from the outer periphery toward the inside space. Numeral 23 refers to engaging surfaces provided on the edges along the axial line of the permanent magnet 2 in such a manner as to face the engaging projections 16. The engaging surfaces 23 are formed so as to essentially orthogonally intersect the flat surfaces 21.

Now, the method of fixedly fitting the permanent magnet 2 in the housing I will be described. As shown in FIG. 4, the permanent magnet 2 is first inserted along the inner circumferential surface of the cylindrical parts 12 of the housing 1 to bring one end face of the permanent magnet 2 in contact with the positioning projections 14. In this case, the gap g between the engaging surfaces 23 of the permanent magnet 2 and the engaging projections 16 should ideally be zero. In practice, however, the gap g should preferably be about 0.1 mm, for example, to allow the permanent magnet 2 to be easily and smoothly inserted.

Numeral 3 refers to a fixing jig formed into a plate having on both edges thereof tapered surfaces 31 that can make slidable contact with the engaging projections 16. As the fixing jig 3 is advanced in the direction shown by an arrow in FIG. 4 and in a state shown in the figure, the tapered surfaces 31 cause the engaging projections 16 to be plastically deformed outward. Thus, the engaging projections 16 cut into the engaging surfaces 23 of the permanent magnet 2, as shown by dotted lines in the figure. As a result, the outer circumferential surface and the flat surfaces 21 of the permanent magnet 2 are brought in close contact with the inner circumferential surfaces of the cylindrical parts 12 and the flat parts 11 of the housing 1, respectively.

In this invention, the permanent magnet 2 must have adequate flexibility, and should preferably be a so-called plastic magnet or bonded magnet produced by a mixture consisting chiefly of ferromagnetic material powder and a binder. As the binder material, nylon resin, polypropylene, polyethylene, polyphenylene oxide, etc. can be used, but nylon resin is most desirable in terms of mechanical strength, magnetic properties, adaptability to mass production, cost, etc. Although injection molding, compression molding, extrusion and other methods are available as the molding means, injection molding is most desirable in terms of dimensional accuracy, adaptability to mass production, etc.

Engaging projections 16 can be formed by providing continuous ridges along the axial direction of the housing 1 in this embodiment, they may also be formed by a plurality of discontinuous projections. The shape of the engaging projections 16 may be other than that shown in this embodiment so long as they may be plastically deformed toward the engaging surfaces 23 of the permanent magnet 2. Moreover, the fixing jig 3 may be of other types than that shown in FIG. 2 so long as it can impart plastic deformation to the engaging projection 16.

This invention having the aforementioned construction and operation has the following effects.

(1) The permanent magnet can be extremely easily inserted into the housing, and positioned precisely without generating unwanted foreign matter due to the frictional resistance caused during the insertion.

(2) The strength with which the permanent magnet is fixed to the housing can be ensured by the engaging projections cut into the inside surface of the housing by plastic deformation, and an adequate fixing strength can be obtained by adjusting the amount of cut into the magnet made by the engaging projections. This leads to a substantial improvement in reliability.

What is claimed is:

1. A stator of a motor, the stator comprising:

a housing;

a flexible and deformable permanent magnet positioned inside said housing;

first and second engaging projections embossed into said housing and integrally formed on said housing, said first and second projections being positioned adjacent circumferential sides of said magnet, said first and second engaging projections being plastically deformed and cut into said magnet causing said magnet to also be deformed and be securely held to said housing.

2. A stator for miniature motors as set forth in claim 1 wherein: said magnet is formed of a mixture consisting of ferromagnetic material powder and a binder resin.

3. A stator in accordance with claim 1, wherein:

said housing has a cylindrical portion and two (2) flat portions, one of said two (2) flat portions being positioned adjacent each of said circumferential sides of said magnet, said first and second engaging projections being said flat portions and adjacent said cylindrical portion;

said magnet having an arch shape with flat surfaces positionable against said flat portions of said housing and said magnet also having engaging surfaces positionable against said first and second engaging projections, said magnet being slidable against an inner circumferential surface of said cylindrical portion.

4. A stator in accordance with claim 3, wherein:

said housing has another cylindrical portion and another first and second engaging projections, and another magnet positioned between said another first and second engaging projections.

5. A stator in accordance with claim 1, wherein:

said deformable first and second engaging projection means deforms from a first position to a second position, said first position of said deformable first and second engaging projection means being spaced apart by a distance larger than said flexible and deformable magnet, said second position of said first and second projection means being spaced apart by a distance that is one of equal to and less than said flexible and deformable magnet.

6. A method for manufacturing a stator of a motor, the method comprising the steps of:

providing a housing with deformable first and second engaging projections, said housing having a cylindrical portion and two (2) flat portions, one of said two (2) flat portions being positioned adjacent each circumferential side of said cylindrical portion, said first and second engaging projections being on said flat portions and adjacent said cylindrical portion;

providing a flexible and deformable magnet of a size less than or equal to a distance between said first and second deformable engaging projections, said magnet having an arch shape with flat surfaces positionable against said flat portions of said housing, said magnet also having engaging surfaces positionable against said first and second engaging projections;

sliding said magnet in between said first and second engaging projections, said sliding of said magnet being against said cylindrical portion;

deforming one of said first and second engaging projections into said magnet to also deform said magnet and hold said magnet securely to said housing;

said housing having another cylindrical portion, and another first and second engaging projections;

sliding another magnet between said another first and second engaging projections;

said first engaging projection and said another first engaging projection are on one of said two (2) flat portions of said housing; and axially inserting a tool between said first engaging projection and said another first engaging projection for deforming said first engaging projection and said another first engaging projection into said magnet and said another magnet.

7. A method in accordance with claim 6, further comprising:

embossing said housing to form said first and second engaging projections.

8. A method in accordance with claim 6, wherein:

both of said first and second engaging projections are deformed into and cut into said magnet.

9. A method in accordance with claim 6, wherein:

said magnet is a permanent magnet.

10. A stator formed by the steps of:

providing a housing with deformable first and second engaging projections, and with deformable another first and second engaging projections;

providing a flexible and deformable magnet of a size less than or equal to a distance between said first and second deformable engaging projections;

providing another flexible and deformable magnet of a size less than or equal to a distance between said another first and second deformable engaging projections;

sliding said magnet in between said first and second engaging projections;

sliding said another magnet in between said another first and second engaging projections;

inserting a tool between said first engaging projection and said another first engaging projection for deforming said first engaging projection and said another first engaging projection into said magnet and said another magnet, said deforming of said projections into said magnet also deforming said magnet and holding said magnet securely to said housing.

11. A stator in accordance with claim 10, wherein:

said deforming of said one of said first and second engaging projections includes said one of said first and second engaging projections cutting into said magnet.

* * * * *

UNITED STATES PATENT AND TRADEMARK OFFICE
CERTIFICATE OF CORRECTION

PATENT NO. : 5,473,210

DATED : December 5, 1995

INVENTOR(S) : Ryouichi Someya, et. al.

It is certified that error appears in the above-indentified patent and that said Letters Patent is hereby corrected as shown below:

Title page, item [73], Assignee's address should read--Chiba-ken, Japan--.

Signed and Sealed this

Twenty-third Day of April, 1996

BRUCE LEHMAN

Attest:

Attesting Officer

Commissioner of Patents and Trademarks